United States Patent [19]

Favret, Jr. et al.

[11] Patent Number: 4,618,430
[45] Date of Patent: Oct. 21, 1986

[54] PROCESS AND APPARATUS FOR REMOVING SCUM FROM A LIQUID SURFACE

[75] Inventors: Uncas B. Favret, Jr., Covington; Phil J. Duhon, Abbeville, both of La.

[73] Assignee: Engineering Specialties, Inc., Covington, La.

[21] Appl. No.: 668,833

[22] Filed: Nov. 6, 1984

[51] Int. Cl.⁴ ............................................. C02F 1/24
[52] U.S. Cl. .................... 210/703; 210/776; 210/195.4; 210/219; 210/221.1
[58] Field of Search .................. 210/219, 221.1, 195.4, 210/199, 201, 608, 703–706, 776

[56] References Cited

U.S. PATENT DOCUMENTS

| | | | |
|---|---|---|---|
| 3,056,749 | 10/1962 | Griffith | 210/221.1 |
| 3,168,465 | 2/1965 | Kraus et al. | 210/221.1 X |
| 3,169,921 | 2/1965 | Griffith | 210/221.1 X |
| 3,735,870 | 5/1973 | Uden | 210/221.1 X |
| 3,972,815 | 8/1976 | O'Cheskey et al. | |
| 4,372,757 | 2/1983 | Favret, Jr. | |

OTHER PUBLICATIONS

Brochure, Di-Chem/Dresser, "Di-Chem's Tridair Flotation Cell . . . " publication date, unknown.

*Primary Examiner*—Thomas Wyse
*Attorney, Agent, or Firm*—Burns, Doane, Swecker & Mathis

[57] ABSTRACT

Waste matter contained in a liquid is removed therefrom by introducing the liquid into a cell and introducing gas into the liquid to float waste matter to the liquid surface in the form of a floating scum. Gas nozzles situated adjacent the liquid surface are oriented to eject streams of pressurized gas across the liquid surface to blow scum into a waste outlet disposed adjacent the liquid surface. The nozzles are vertically adjustable to conform to different liquid surface levels.

17 Claims, 5 Drawing Figures

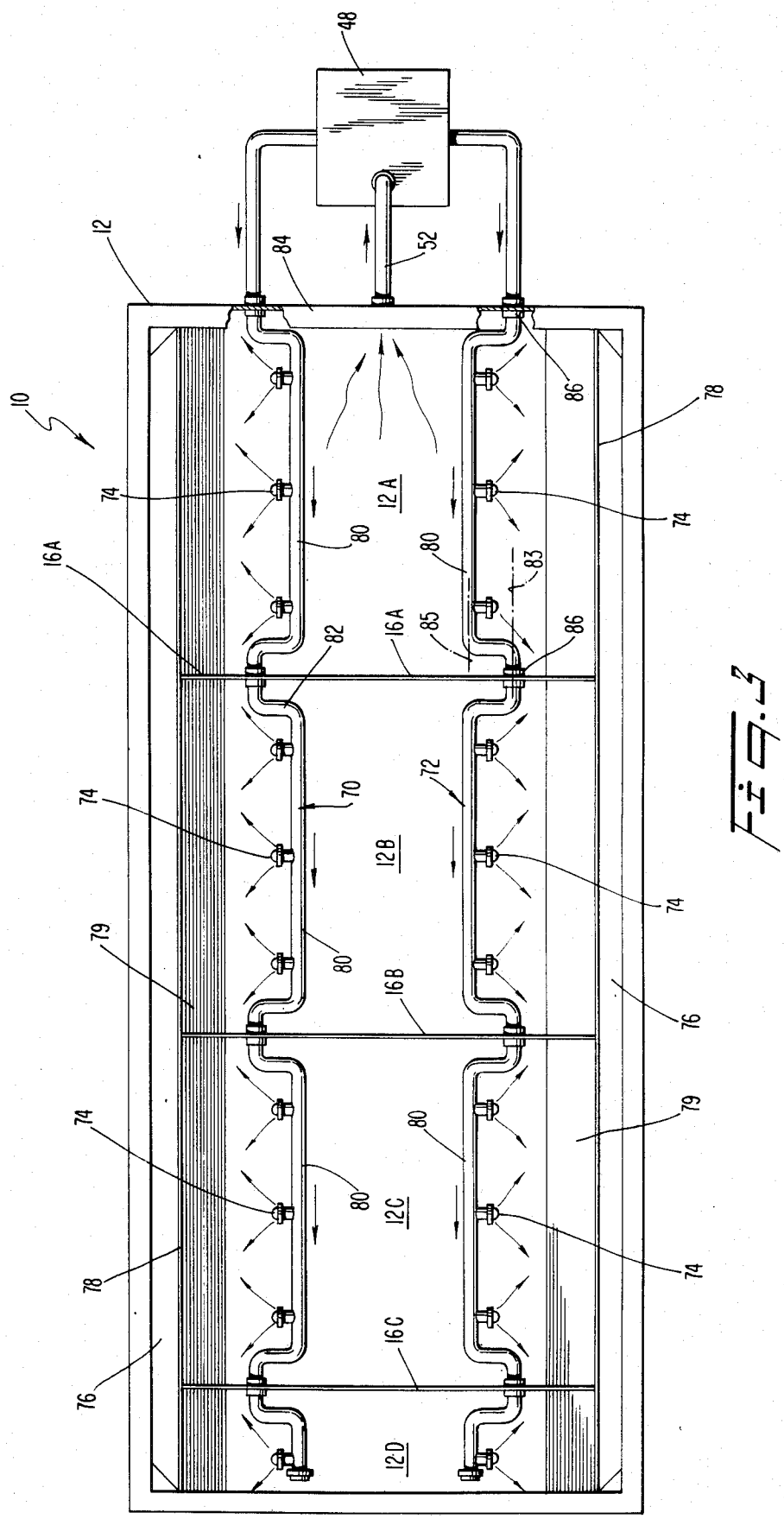

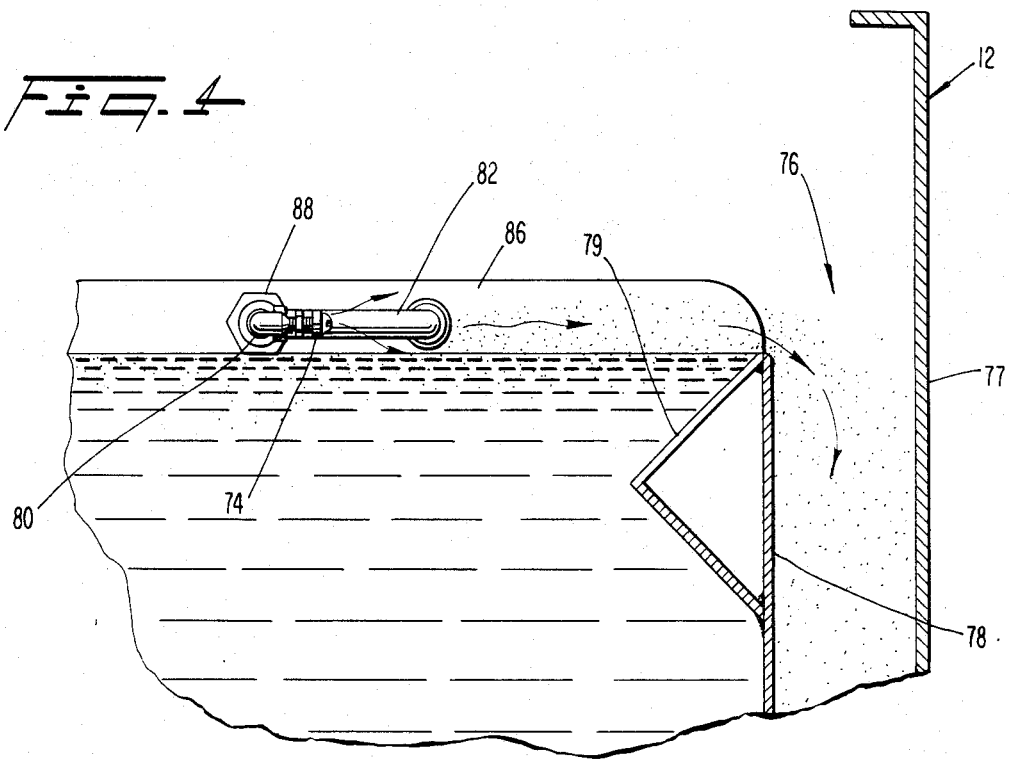
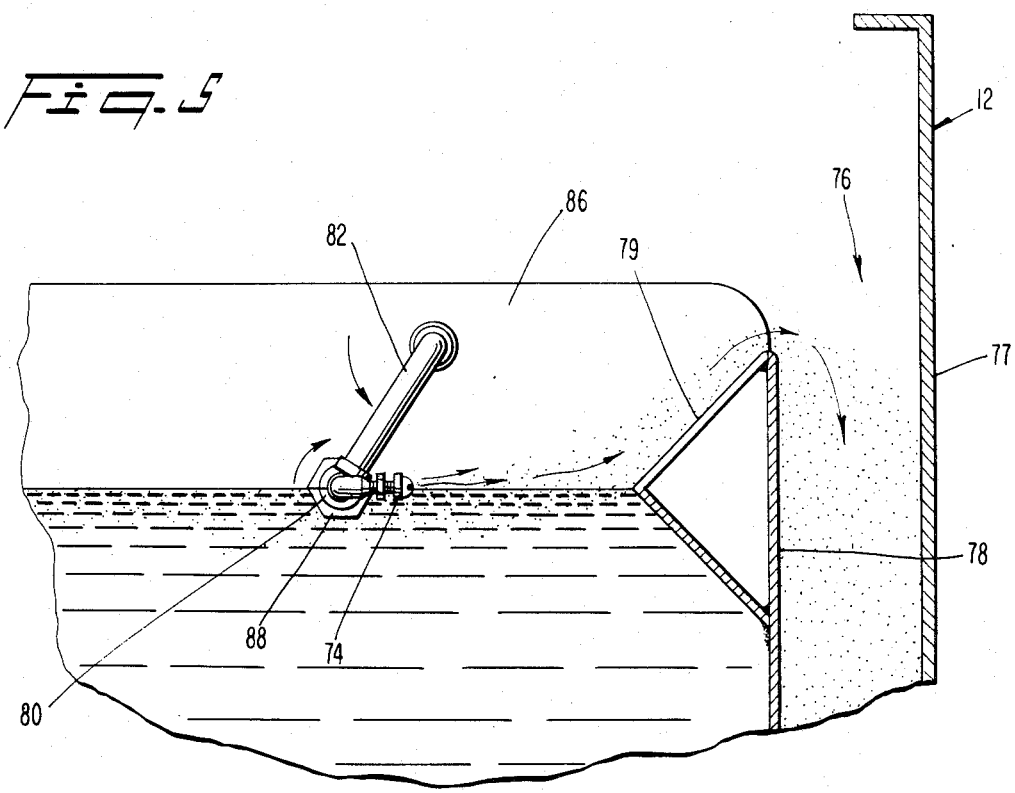

PROCESS AND APPARATUS FOR REMOVING SCUM FROM A LIQUID SURFACE

BACKGROUND AND OBJECTS OF THE INVENTION

The present invention relates to the removal of oil, solids and other waste from a liquid and, in particular, to the removal of scum from a liquid surface in a gas flotation process.

In certain instances it is necessary to separate waste matter from a waste liquid in which the waste matter is emersed, e.g., the removal of solids or oil from water. This can be achieved by means of a so-called gas flotation process in which a gas, such as natural gas for example, is introduced into the liquid. The gas is atomized and the bubbles adhere to solids and float them to the liquid surface where they collect as a froth or scum. Skimmer blades disposed at the surface level are rotated to push the scum into an external conduit for disposal. Such a system is disclosed, for example in O'Cheskey et al U.S. Pat. No. 3,972,815 issued Aug. 3, 1976.

In particular, it has been common to deliver the waste liquid to a cell and force the gas through the bottom of a conduit which projects downwardly into the liquid. The gas can be drawn into the conduit by means of a Venturi-type nozzle as treated waste water is circulated through the conduit. The gas is drawn from a gas blanket maintained above the liquid surface in the cell. The gas blanket, which prevents oxidation within the tank, is circulated at low pressure by means of a gas blower.

The skimmer blades can be in the form of rotary paddles which are rotatably mounted on motor-driven horizontal axles located at opposite sides of the cell. The paddles can be mounted for vertical adjustment so as to be adaptable to different liquid surface levels.

In certain cases the scum which is expelled can constitute a valuable substance, such as oil, which can be subsequently sold as a petroleum product. However, since the skimming paddles expell a considerable quantity of liquid along with the oil scum, e.g., the expelled substance may comprise 90% liquid, the substance must be treated in order to separate the oil from the liquid. In addition, the paddles themselves are relatively expensive to purchase, operate and maintain, and are difficult to adjust vertically.

It is, therefore, an object of the present invention to minimize or obviate shortcomings of the types discussed above.

Another object is to provide a gas flotation apparatus in which the expelled scum contains little, if any, liquid.

A further object is to provide a scum expelling mechanism which is relatively inexpensive to install, operate and maintain.

Another object is to provide a scum expelling mechanism which is easily adjustable to accommodate different liquid levels.

SUMMARY OF THE INVENTION

These objects are achieved by the present invention which relates to the process and apparatus for removing waste matter contained in a liquid.

The apparatus comprises a cell for receiving waste-containing liquid. Conduits are provided for introducing gas into the waste-containing liquid in the cell to float waste matter to the liquid surface in the form of a floating scum. A waste outlet is disposed adjacent the liquid surface. Gas nozzles are situated adjacent the liquid surface and are oriented to eject streams of pressurized gas across the liquid surface to blow scum into the waste outlet.

Preferably, a pressurized gas blanket is circulated above the cell by means of a blower. The blower communicates with the gas nozzles to conduct gas thereto.

Preferably, the nozzles are vertically adjustable. Such adjustment can be provided by mounting the nozzles on conduits which define first and second mutually spaced axes of rotation.

A process aspect of the present invention involves locating a waste-containing liquid in a cell. Gas is introduced into the liquid to float waste matter to the liquid surface to form a floating scum thereon. A stream of pressurized gas is ejected across the liquid surface from a nozzle located adjacent the water surface and directed toward a waste outlet to displace scum theretoward.

THE DRAWING

The objects and advantages of the invention will become apparent from the following detailed description of a preferred embodiment thereof in connection with the accompanying drawings, in which like numerals designate like elements, and in which:

FIG. 3 is a top plan view of the interior of the tank, depicting gas being ejected from a series of scum-removal nozzles;

FIG. 4 is a side elevational view taken within one of the cells of the tank, depicting the scum-removal nozzles adapted to a particular liquid surface level; and FIG. 5 is a view similar to FIG. 4, depicting the nozzles after they have been vertically lowered to accommodate a lower liquid surface level.

DETAILED DESCRIPTION OF A PREFERRED EMBODIMENT OF THE INVENTION

Figure 1:
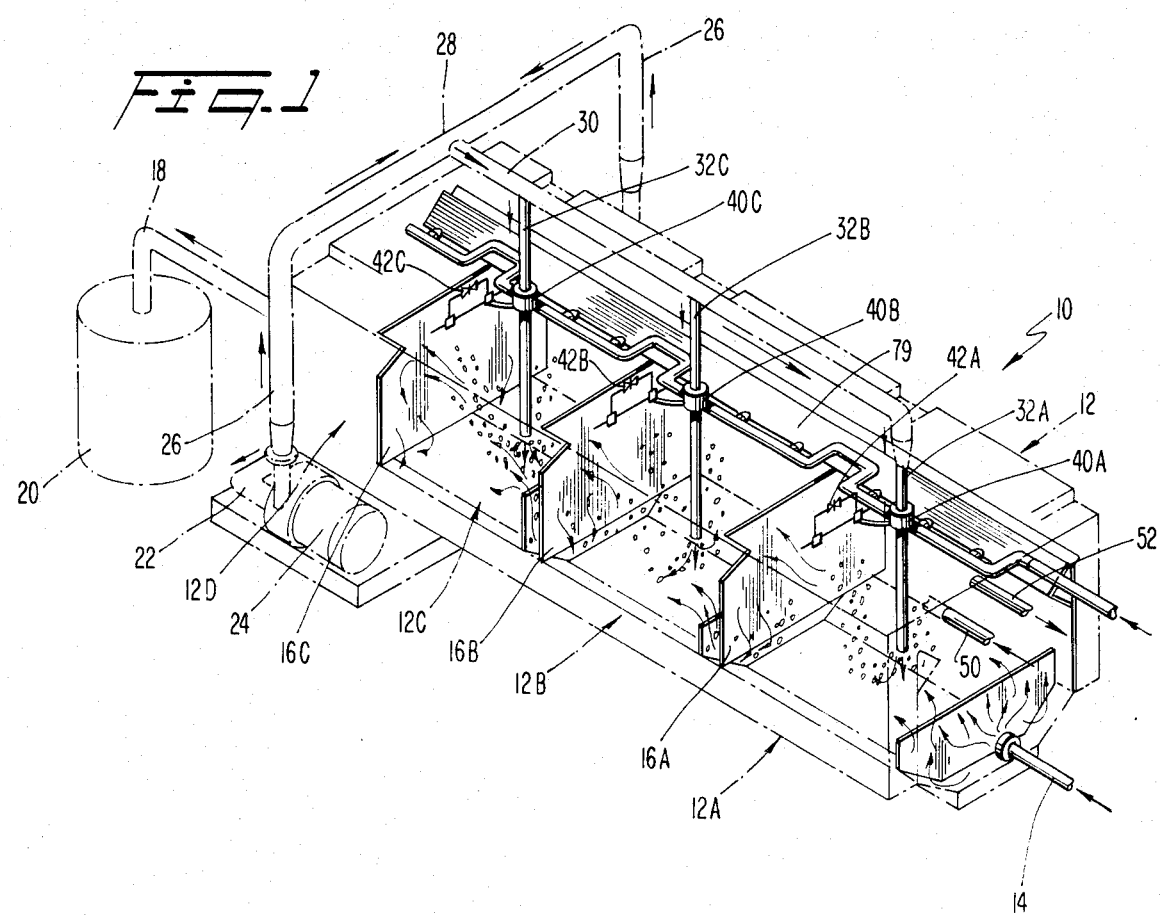
FIG. 1 is a perspective schematic view of the interior of a tank employed in a gas flotation process according to the present invention.
Figure 2:
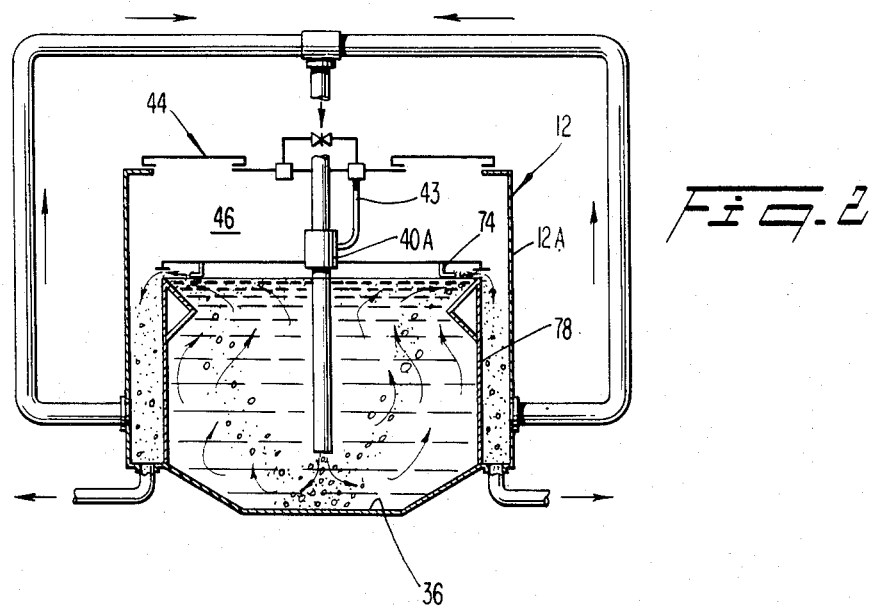
FIG. 2 is a schematic side elevational view of the interior of a cell in the tank according to FIG. 1.

In FIG. 1, there is depicted an apparatus 10 employed in a gas flotation process. The apparatus includes a closed tank 12 which is divided by a plurality of baffles 16A, 16B, 16C into a plurality of series-connected cells 12A, 12B, 12C and 12D through which is conducted a flow of waste liquid which contains waste matter. For example, a water flow which contains oil and/or solids can be delivered by an inlet pipe 14 to a first of the cells 12A. The waste liquid passes to the next cell 12B through a gap disposed beneath the baffle 16A. The gap can be dimensioned to exclude the passage of solids above a given size. The waste water continues passage beneath successive baffles 16B and 16C in the succeeding cells, the baffle-defined gaps becoming progressively shorter. Any desired number of cells can be utilized. Eventually, treated liquid is discharged from the final cell 12D through an outlet pipe 18 to a holding tank 20 or the like.

Treated liquid is also utilized to educt gas into the cells. In that regard, treated liquid is removed from the final cell through pipes 22 situated at opposite sides of the final cell and is pumped by means of pumps 24 upwardly through upstanding pipes 26, and horizontal pipes 28 to a common horizontal manifold 30 which extends above the tank 12. A series of vertical discharge conduits 32A, 32B, 32C depend from the manifold 30 and project downwardly into the liquid in respective cells, so that the lower outlet ends of the conduits 32A-C face downwardly and are situated just above the floor 36 of the associated cell. Treated liquid is thus conducted downwardly through the conduits 32A-C and into the associated cells 12A-C.

Mounted on the conduits 32A-C are Venturi-type nozzles 40A, 40B, 40C which serve to admit gas into the conduits 32A-C. The venturi nozzles, which can be of a conventional nature, communicate with gas, such as natural gas which contains no oxygen. The gas can be drawn from any suitable source such as from a blanket of such gas which is maintained in a space 46 between the top of the liquid level and a roof 44 of the tank in order to retard oxidation within the tank. Negative pressure is generated in each venturi nozzle as treated liquid flows therethrough. The negative pressure draws gas into the liquid and is ejected into the bottom of the associated cell and dispersed therethroughout as minute gas bubbles. The bubbles combine with waste particles, e.g., solds, oil, etc., causing the particles to float to the surface of the liquid and collect there in the form of a scum.

The surfacing gas is released into the gas blanket which is continually circulated by a blower 48 which slightly pressurizes the gas, e.g., at about 0.5 oz/sq ft. The gas is removed from the space 46 through a conduit 52, and is reintroduced through a conduit 50 located below the conduit 52.

As described thusfar, the apparatus corresponds to that of known prior art. The present invention, however, differs with regard to the manner of removing the scum which collects at the liquid surface in the cells. As observed earlier herein, the prior art employment of rotary paddles typically results in the expulsion of an appreciable amount of liquid along with the scum, requiring that a subsequent treatment be carried out to separate the scum from the liquid in cases where the waste is to be recovered, e.g., the recovery of waste oil from water. Also, the paddles and paddle motors are costly and energy consuming, as well as difficult to adjust vertically, and also increase the overhead space required. Those shortcomings are avoided by the present invention which utilizes gas streams to remove the scum.

In that regard, gas conduits 70, 72 are situated at opposite sides of the tank within the space 46. Each gas conduit extends throughout all of the cells and communicates with the blower 48. Thus, the blower 48, which is already provided to circulate the gas blanket, is preferably utilized as a source of pressurized gas. Connected to the conduits 70, 72 are a plurality of gas ejection nozzles 74. The nozzles are spaced along the conduits so as to eject laterally outwardly directed, generally horizontally disposed streams of gas which together define a continuous gas flow along the sides of the cell from one baffle plate to the other, i.e., along both side edges of the liquid surface. The gas streams serve to blow the scum off the liquid surface and into discharge troughs 76 located at the cell sides. The troughs 76 are defined between side walls 78 of the cell, and side walls 77 of the tank, the former including weirs at their upper edges 79.

The pressure of the ejection gas from the nozzles 74 can vary, e.g., 5–8 psi has been found suitable for blowing an oil scum from a water surface, with power being supplied by a blower 48 that generates a gas flow of about 40–50 standard cubic feet per minute.

It has been found that the removal of scum in that fashion is accompanied by little, if any, liquid, so as to avoid or at least substantially eliminate the need for subsequent treatment to separate the scum from liquid.

The nozzles 74 are adjustable so as to be adaptable to liquid surfaces of different levels. This is achieved by providing, in each cell, a conduit section which comprises a main portion 80 and offset mounting portions 82. The latter are connected for rotation about a common horizontal axis 83 which is parallel to and spaced from the axis 85 of the associated main portion 80. A conduit section in the initial cell 12A has its mounting portions 82 rotatably connected in an end wall 84 of the tank and a baffle plate 16A, respectively, by means of standard union fittings 86 which are adapted to permit the mounting portions 82 to rotate about a common axis 83 defined by the aligned union fittings. This enables the main portion 80 to be vertically moved (see FIG. 5) to accommodate for a different liquid surface level. Vertical movement of the main portion 80 in that fashion is accompanied by rotational adjustment of the main portion 80 to maintain the nozzles 74 oriented to spray horizontally across the liquid surface. Such rotational adjustment is achieved by mounting the main portion 80 to the associated mounting portions 82 by means of union fittings 88 which permit the main portion 80 to be rotated about its own longitudinal axis relative to the mounting portions. Thus, the nozzles 74 can be reoriented to continue spraying horizontally.

IN OPERATION, waste liquid is introduced into an initial cell 12A of the tank 12 through the pipe 14. At the same time, gas-containing liquid is delivered to the bottom of the cell through the conduit 32A. Gas bubbles adhere to waste particles (e.g., oil) and float them to the liquid surface where they collect as scum. Scum located adjacent the lateral edges of the cell are blown into the discharge troughs 76 by gas streams from the gas nozzles 74. If necessary, the nozzles can be vertically adjusted to accommodate a different liquid surface level by (i) rotating the mounting portions 82 of the conduits 70, 72 about the axes 83, and also (ii) rotating the main portions 80 about the axes 85. In that fashion, the nozzles can be reoriented to continue ejecting gas generally horizontally.

The scum ejector nozzles according to the present invention expell little, if any, liquid from the cell and thus eliminate or at least greatly reduce the need for subsequent treatment to separate the scum from the liquid in cases where it is desirable to do so. Furthermore, the nozzles are relatively inexpensive to install and maintain. Since the nozzles utilize an already-employed blower, only minimal added energy expenditures are involved. Also, the vertical adjustment of nozzles to accommodate different liquid surface levels is relatively easy. Moreover, due to their short profile, the nozzles and associated conduits do not require extra space at the top of the tank.

Although the present invention has been described in connection with a preferred embodiment thereof, it will be appreciated by those skilled in the art that additions, modifications, substitutions, and deletions, not specifically described, may be made without departing from the spirit and scope of the invention, as defined in the appended claims.

What is claimed is:

1. An apparatus for removing waste matter contained in a liquid, comprising:
   a cell for receiving waste-containing liquid;

means for introducing gas into the waste-containing liquid in said cell to float waste matter to the liquid surface in the form of a floating scum;

a waste outlet disposed adjacent at least one edge of the liquid surface, means for displacing scum into said waste outlet comprising gas nozzle means situated adjacent the liquid surface and oriented to eject streams of pressurized gas across the liquid surface to blow scum into said waste outlet, and means for supplying pressurized gas to said nozzles at a pressure sufficient to blow the scum into said waste outlet.

2. Apparatus according to claim 1, including gas blower means for circulating a pressurized gas blanket above said cell, said blower means communicating with said gas nozzle means to conduct gas thereto.

3. Apparatus according to claim 1, wherein said means for introducing gas into said waste liquid comprises a venturi nozzle, and means for circulating treated liquid from said cell into said venturi nozzle to educt gas thereinto.

4. Apparatus according to claim 1, wherein said nozzle means is vertically adjustable.

5. Apparatus according to claim 4, wherein said nozzles are mounted on means defining first and second mutually spaced axes of rotation.

6. Apparatus according to claim 4 including gas conduit means extending along a side of said cell adjacent said waste outlet and adjacent the liquid surface, said conduit means including a pair of mounting portions at its ends, said mounting portions mounted for rotation about a first generally horizontal axis, and a main portion connected to one end of each of said mounting portions and being rotatable relative thereto about a second generally horizontal axis disposed parallel to and spaced from said first axis, said nozzle means being mounted on said main portion.

7. Apparatus according to claim 4, wherein said nozzle means comprises a plurality of nozzles arranged to emit generally horizontal gas streams across the liquid surface.

8. An apparatus for removing waste matter contained in a liquid, comprising:

a tank;

a plurality of upright baffles spaced apart horizontally in said tank to divide said tank into cells, said baffles defining gaps to communicate said cells in series;

means for introducing waste-containing liquid into an initial one of said cells so that the liquid travels sequentially through said cells by means of said gas and exits a final cell as a treated liquid;

recirculating means for recirculating some of said treated liquid back into each said cell;

venturi nozzles in said recirculating means for educting gas into the treated liquid so that the gas disperses within said cells and floats waste matter to the liquid surface in each cell in the form of a floating scum;

a blower communicating with a space above said cells for circulating gas in said space;

waste outlets disposed along opposite sides of each cell adjacent the liquid surface; and a group of gas nozzles disposed at the liquid surface at each side of each cell, each said group of nozzles directed toward the one of said waste outlets nearest thereto and communicating with said blower to direct pressurized gas streams across the liquid surface and toward said nearest waste outlet to displace scum into the latter.

9. Apparatus according to claim 8, wherein said nozzles are vertically adjustable.

10. Apparatus according to claim 9, wherein said nozzle is mounted on means defining first and second mutually spaced axes of rotation.

11. Apparatus according to claim 9 including a pair of gas conduit means extending along the sides of each cell adjacent said waste outlets and adjacent the liquid surface, each said conduit means including a pair of mounting portions at its ends, said mounting portions mounted for rotation about a first generally horizontal axis, and a main portion connected to one end of each of said mounting portions and being rotatable relative thereto about a second generally horizontal axis disposed parallel to and spaced from said first axis, one of said groups of nozzles being mounted on said main portion.

12. A process for removing waste from a liquid, comprising the steps of:

locating the liquid in a cell;

introducing gas into the liquid to float waste matter to the liquid surface to form a floating scum thereon; and ejecting a stream of pressurized gas across the liquid surface from a nozzle located adjacent the water surface and directed toward a waste outlet disposed along a side of said cell, to displace the scum into said waste outlet.

13. A process according to claim 12, wherein the gas is oxygen-free.

14. A process according to claim 12 including the step of maintaining a blanket of gas above the liquid surface, circulating the gas blanket by a blower, and directing gas to said nozzle from said blower.

15. A process according to claim 12 including the step of vertically adjusting said nozzle to accommodate for different liquid surface levels.

16. A process according to claim 15, wherein said nozzle is vertically adjusted by rotating said nozzle about first and second generally horizontal axes which are mutually spaced and parallel.

17. A process according to claim 12, wherein a plurality of nozzles are provided which blow laterally outwardly directed streams of air across opposite sides of said cell to displace scum into waste outlets disposed along said sides.

* * * * *